Figure 1:
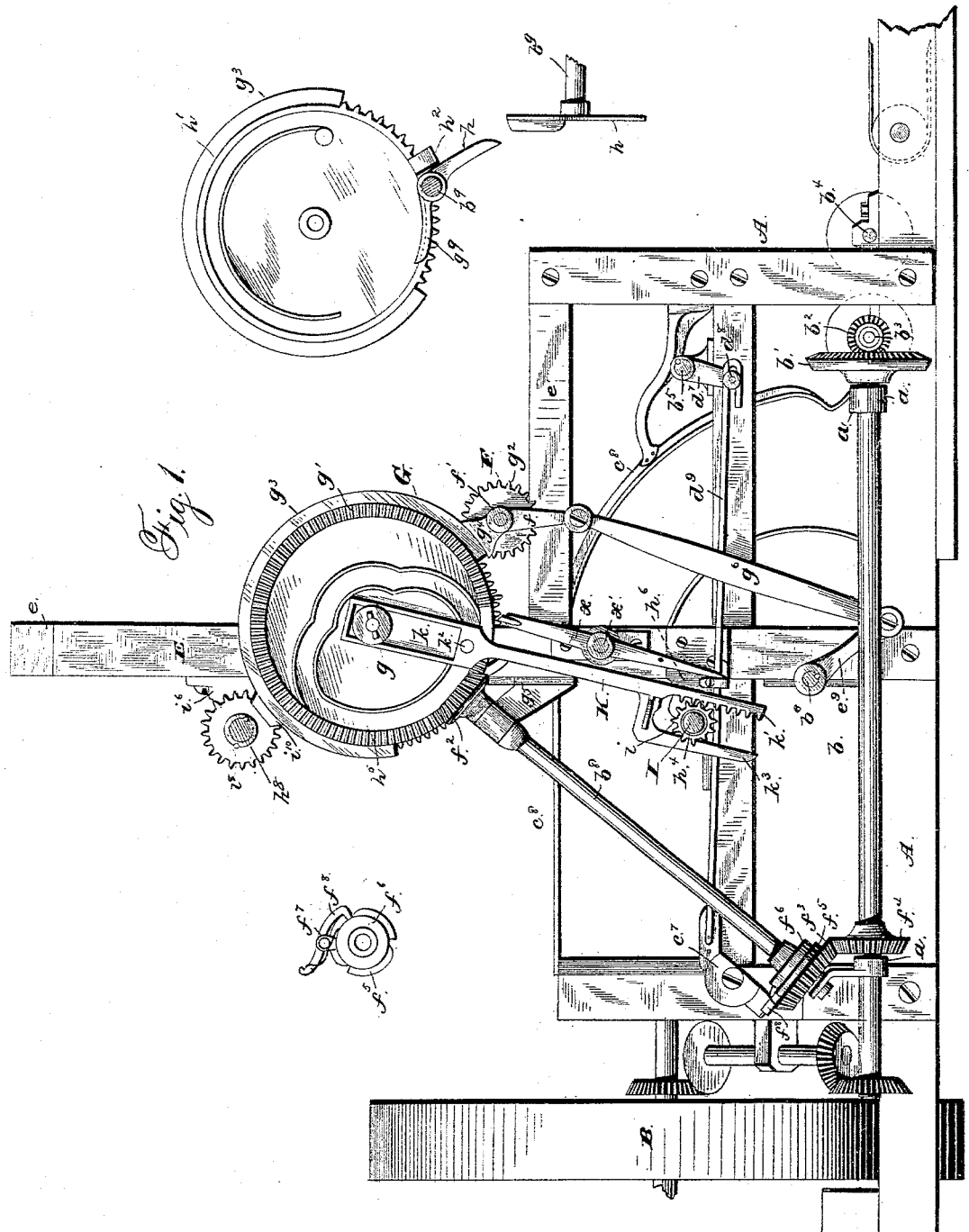

(Model.)

M. D. TAYLOR.
SELF BINDING HARVESTER.

No. 331,921. Patented Dec. 8, 1885.

10 Sheets—Sheet 1.

WITNESSES
Jas. E. Hutchinson
Wm T. Gill

INVENTOR
M. D. Taylor
By H. A. Seymour
ATTORNEY (Model.)

M. D. TAYLOR.
SELF BINDING HARVESTER.

No. 331,921.

10 Sheets—Sheet 2.

Patented Dec. 8, 1885.

WITNESSES
Jas. E. Hutchinson.
Wm. T. Gill

INVENTOR
M. D. Taylor
By H. A. Seymour
ATTORNEY (Model.)

10 Sheets—Sheet 3.

M. D. TAYLOR.
SELF BINDING HARVESTER.

No. 331,921. Patented Dec. 8, 1885.

WITNESSES
Jas. E. Hutchinson.
Wm T. Gill

INVENTOR
M. D. Taylor
By H. A. Seymour
ATTORNEY (Model.)

M. D. TAYLOR.
SELF BINDING HARVESTER.

No. 331,921. Patented Dec. 8, 1885.

WITNESSES
Jas. E. Hutchinson
Wm. T. Gill

INVENTOR
M. D. Taylor
By H. A. Seymour,
ATTORNEY (Model.)
M. D. TAYLOR.
SELF BINDING HARVESTER.
No. 331,921. 10 Sheets—Sheet 6. Patented Dec. 8, 1885.
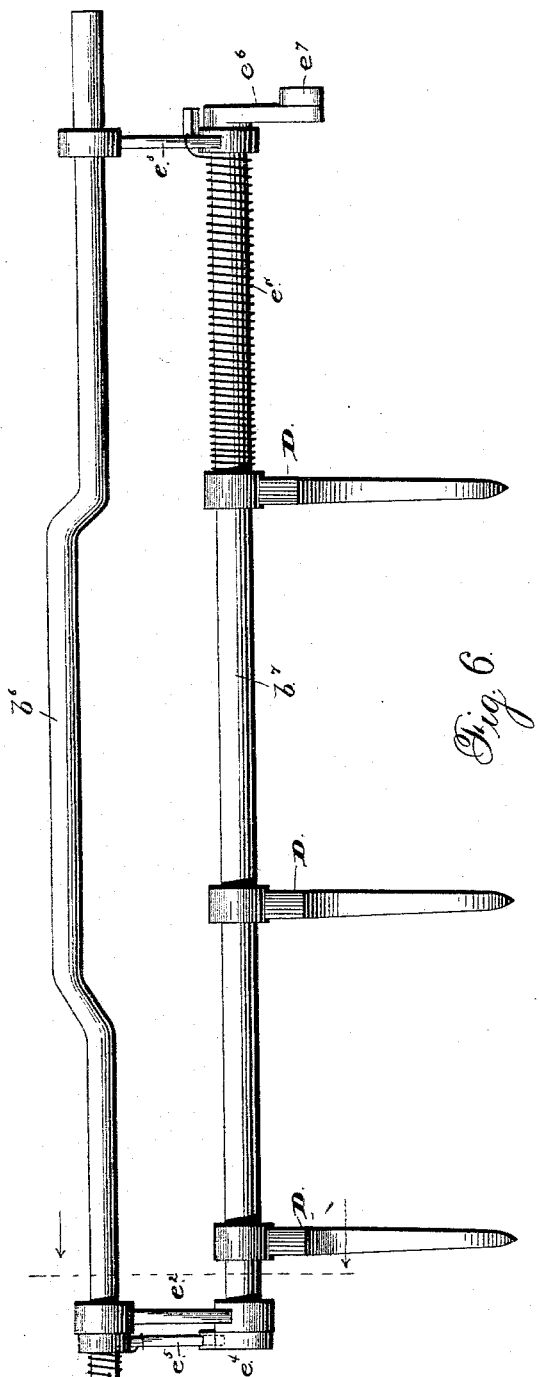
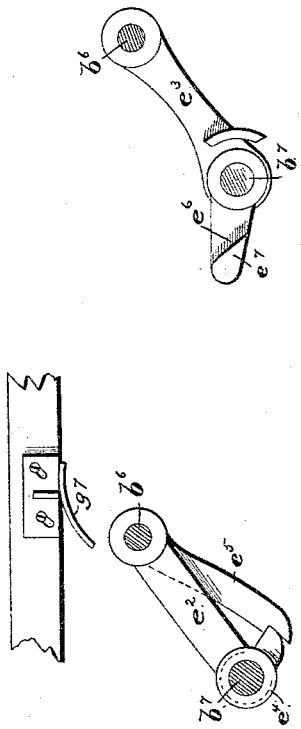
WITNESSES
Jas. C. Hutchinson.
Wm. T. Gill
INVENTOR
M. D. Taylor
By H. A. Seymour
ATTORNEY (Model.)
M. D. TAYLOR.
SELF BINDING HARVESTER.
No. 331,921. Patented Dec. 8, 1885.
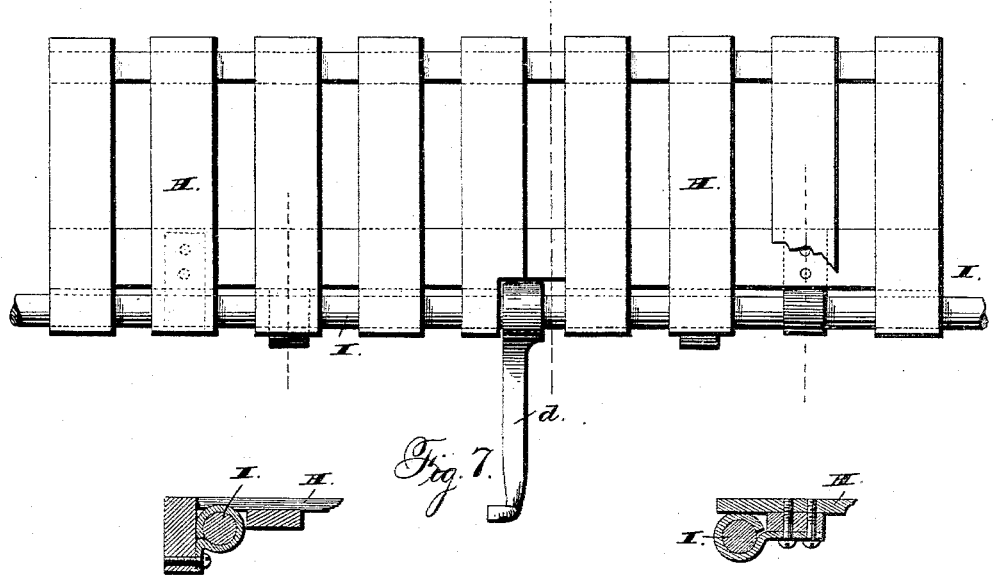
Fig. 7.
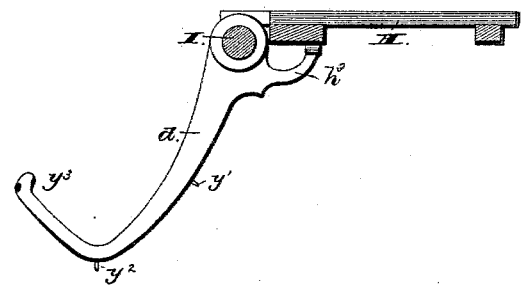
Fig. 17.
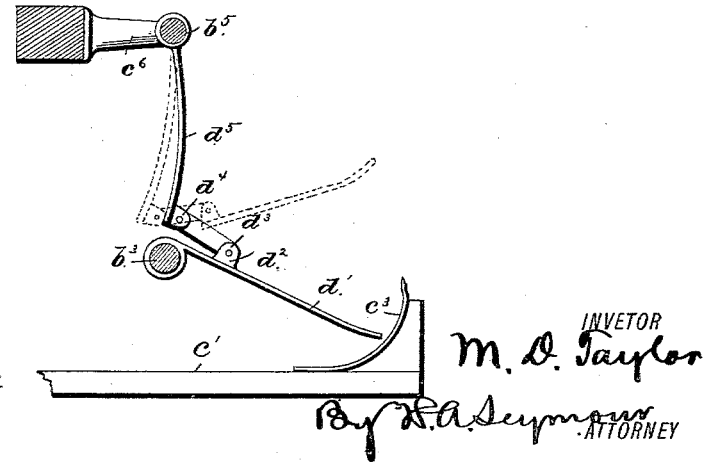
WITNESSES
Jas. E. Hutchinson.
Wm. T. Gill.
INVENTOR
M. D. Taylor
By D. A. Seymour
ATTORNEY
N. PETERS. Photo-Lithographer. Washington, D. C.

(Model.)
M. D. TAYLOR.
SELF BINDING HARVESTER.
No. 331,921. Patented Dec. 8, 1885.
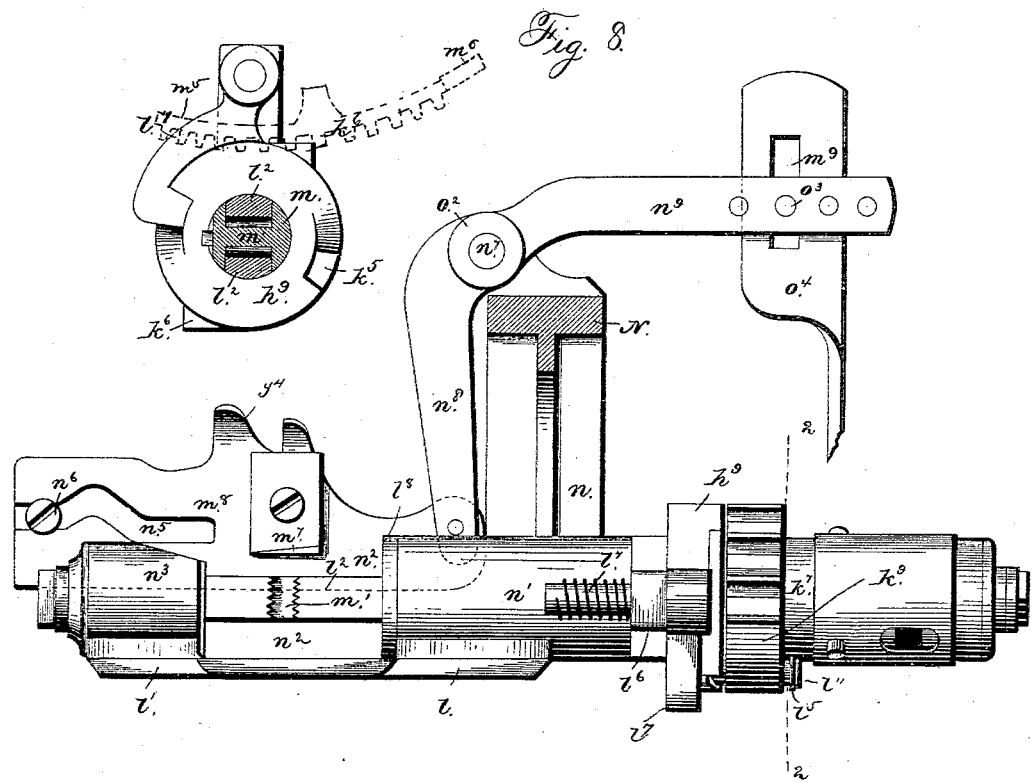
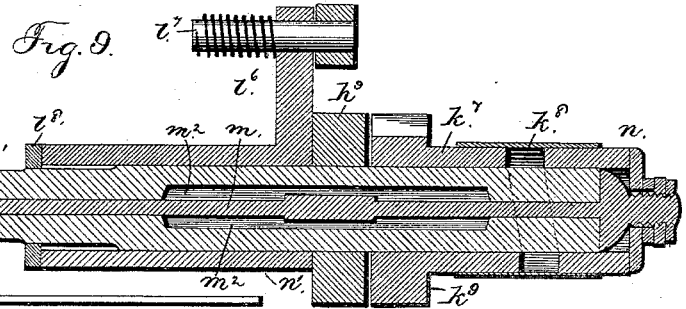
WITNESSES
Jas. E. Hutchinson.
Wm T. Gill
INVENTOR
M. D. Taylor.
By H. A. Seymour.
ATTORNEY (Model.) 10 Sheets—Sheet 9.
M. D. TAYLOR.
SELF BINDING HARVESTER.
No. 331,921. Patented Dec. 8, 1885.
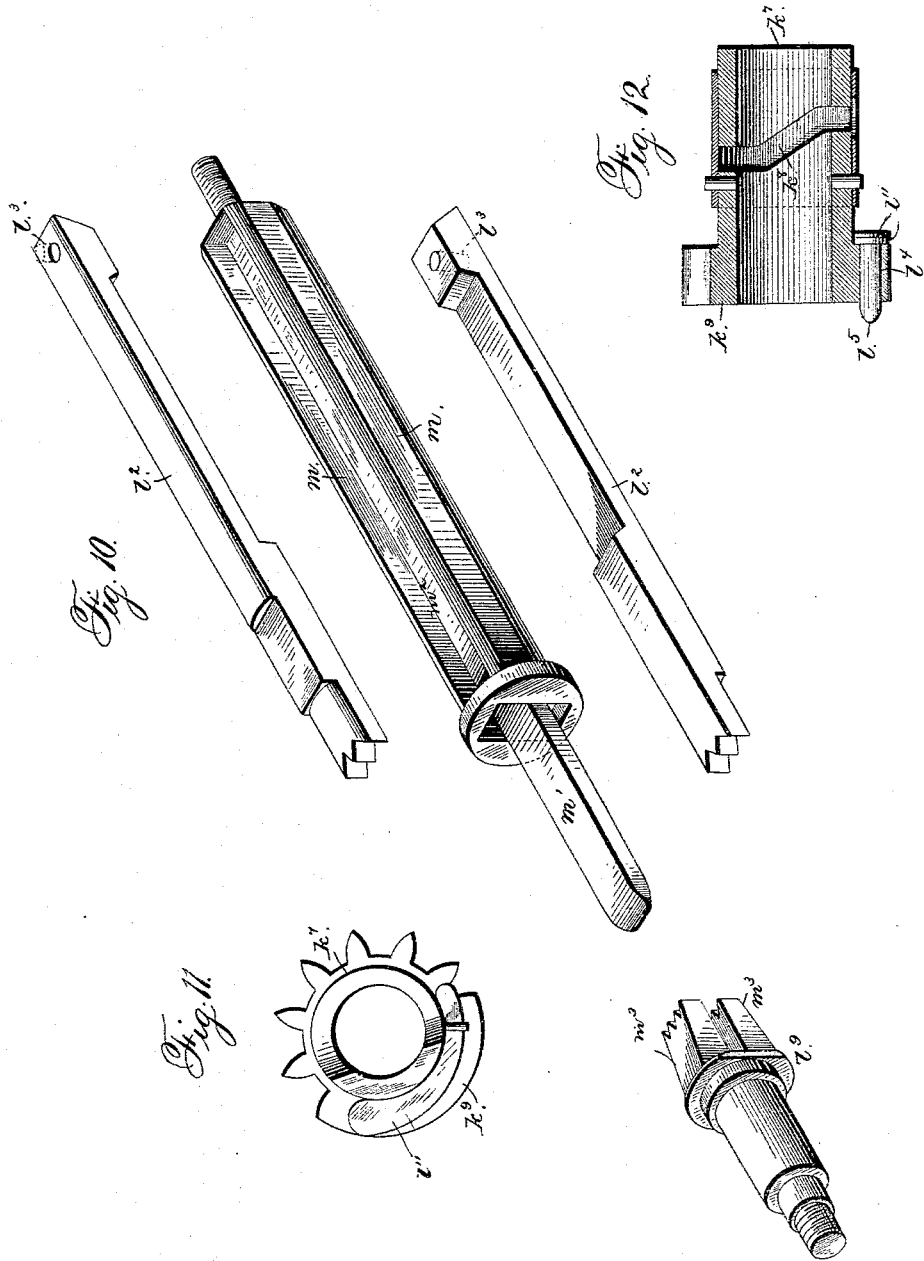
WITNESSES
Jas. E. Hutchinson
Wm. T. Gill
INVENTOR
M. D. Taylor
By H. A. Seymour
ATTORNEY (Model.)
M. D. TAYLOR.
SELF BINDING HARVESTER.
No. 331,921. Patented Dec. 8, 1885.
10 Sheets—Sheet 10.
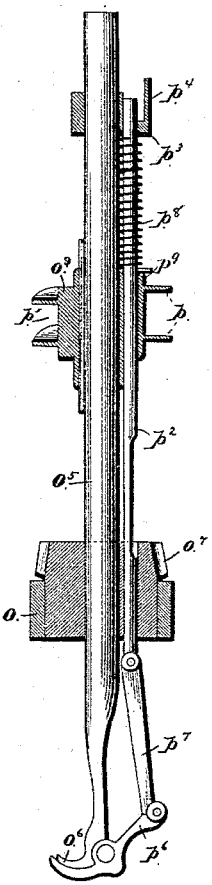
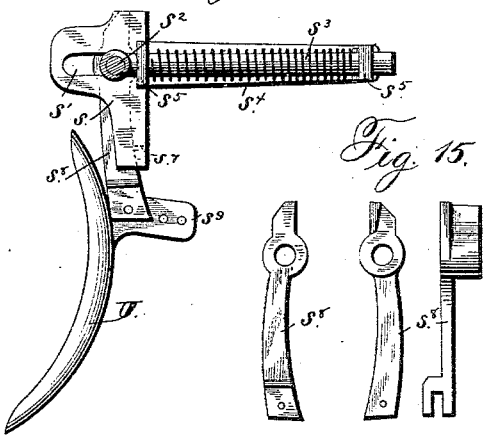
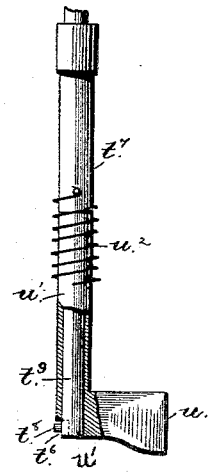
WITNESSES
Jas. E. Hutchinson.
Wm. T. Gill.
INVENTOR
M. D. Taylor
By H. A. Seymour
ATTORNEY

UNITED STATES PATENT OFFICE.

MILES D. TAYLOR, OF JANESVILLE, WISCONSIN, ASSIGNOR OF ONE-HALF TO WILLIAM C. STEVENS, OF SAME PLACE.

SELF-BINDING HARVESTER.

SPECIFICATION forming part of Letters Patent No. 331,921, dated December 8, 1885.

Application filed June 20, 1884. Serial No. 135,508. (Model.)

*To all whom it may concern:*

Be it known that I, MILES D. TAYLOR, of Janesville, in the county of Rock and State of Wisconsin, have invented certain new and useful Improvements in Self-Binding Harvesters; and I do hereby declare the following to be a full, clear, and exact description of the invention, such as will enable others skilled in the art to which it appertains to make and use the same.

My invention relates to an improvement in self-binding harvesters, the object being to provide improved mechanism for automatically transferring the cut grain from the reaper to the binder in bundles of required size, and for automatically binding and discharging the same. With these ends in view my invention consists in a set of endless chains moved at varying rates of speed to insure a more perfect division of the grain.

My invention further consists in a set of lifting-arms and arm-actuating mechanism, in combination with a grooved receptacle, whereby the gavel is carried to the binder and the arms returned to their position without entangling the grain.

My invention further consists in a spring-pressed arm and mechanism connected therewith, which determine the size of a bundle by automatically throwing the binder in gear.

My invention further consists in an improved cord-holder for the twine, whereby waste is avoided.

My invention further consists in a combined yielding abutment and ejector.

My invention further consists in certain features of construction and combinations of parts, as will be hereinafter described, and pointed out in the claims.

Figure 2:
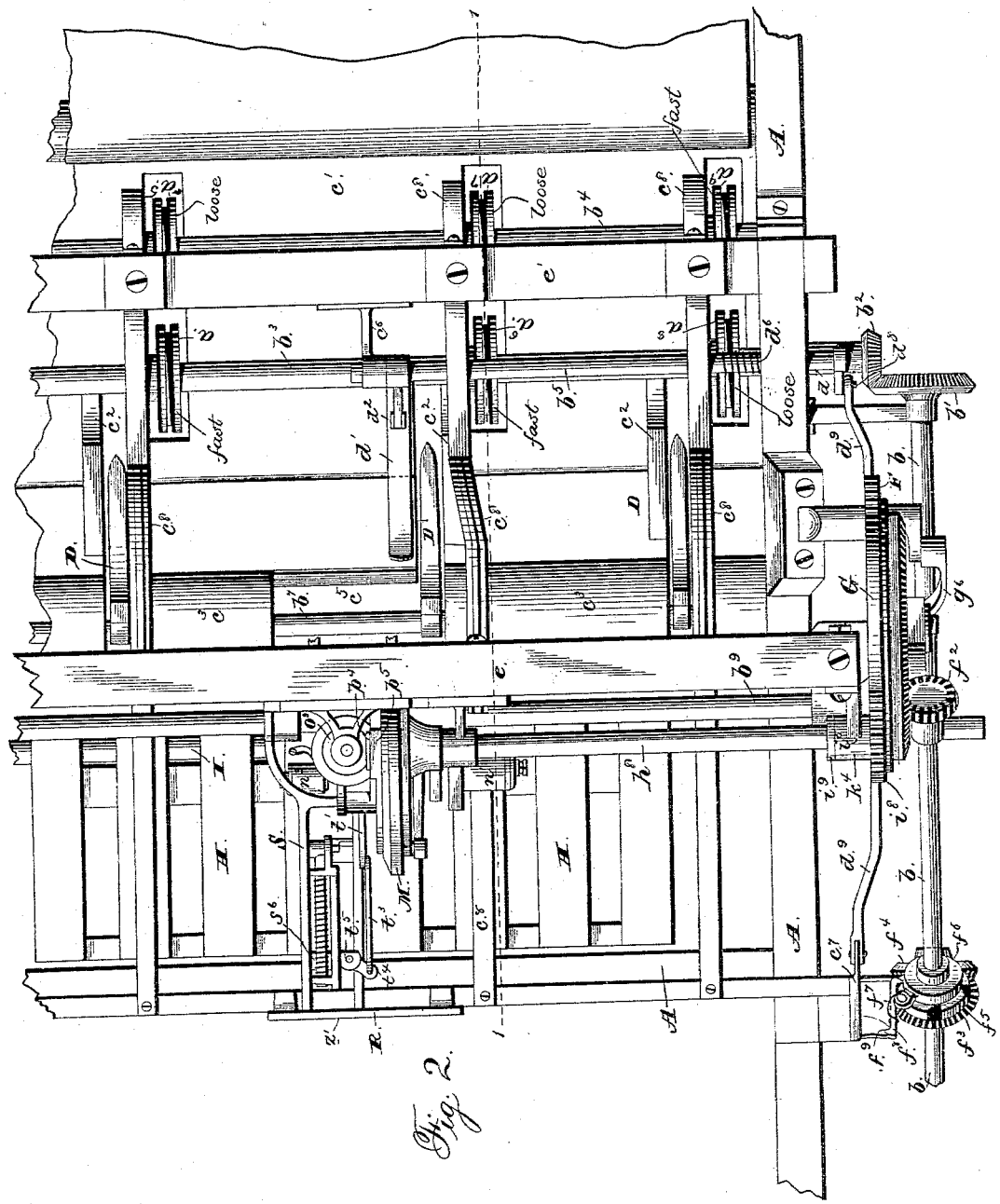
Figure 3:
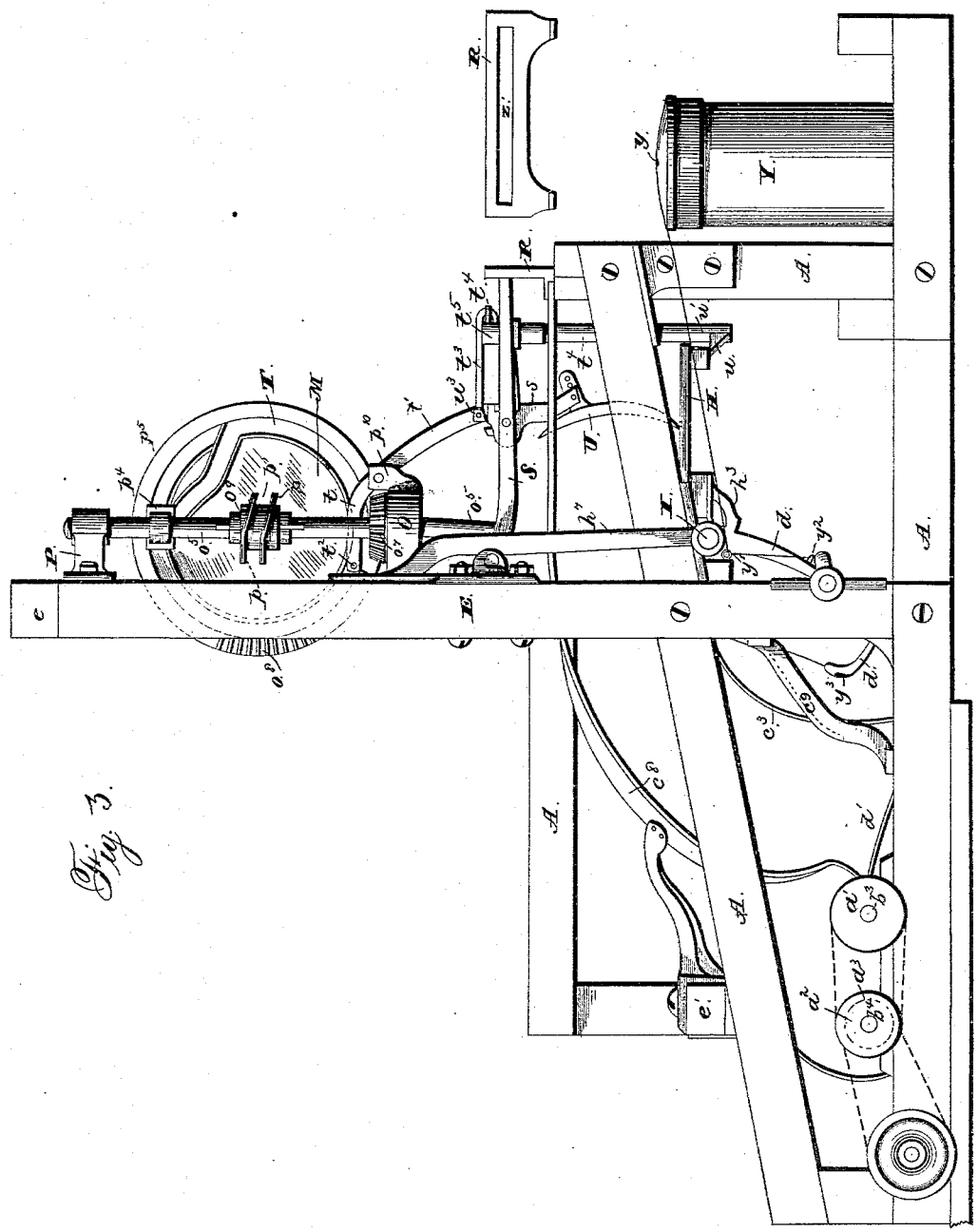
Figure 4:
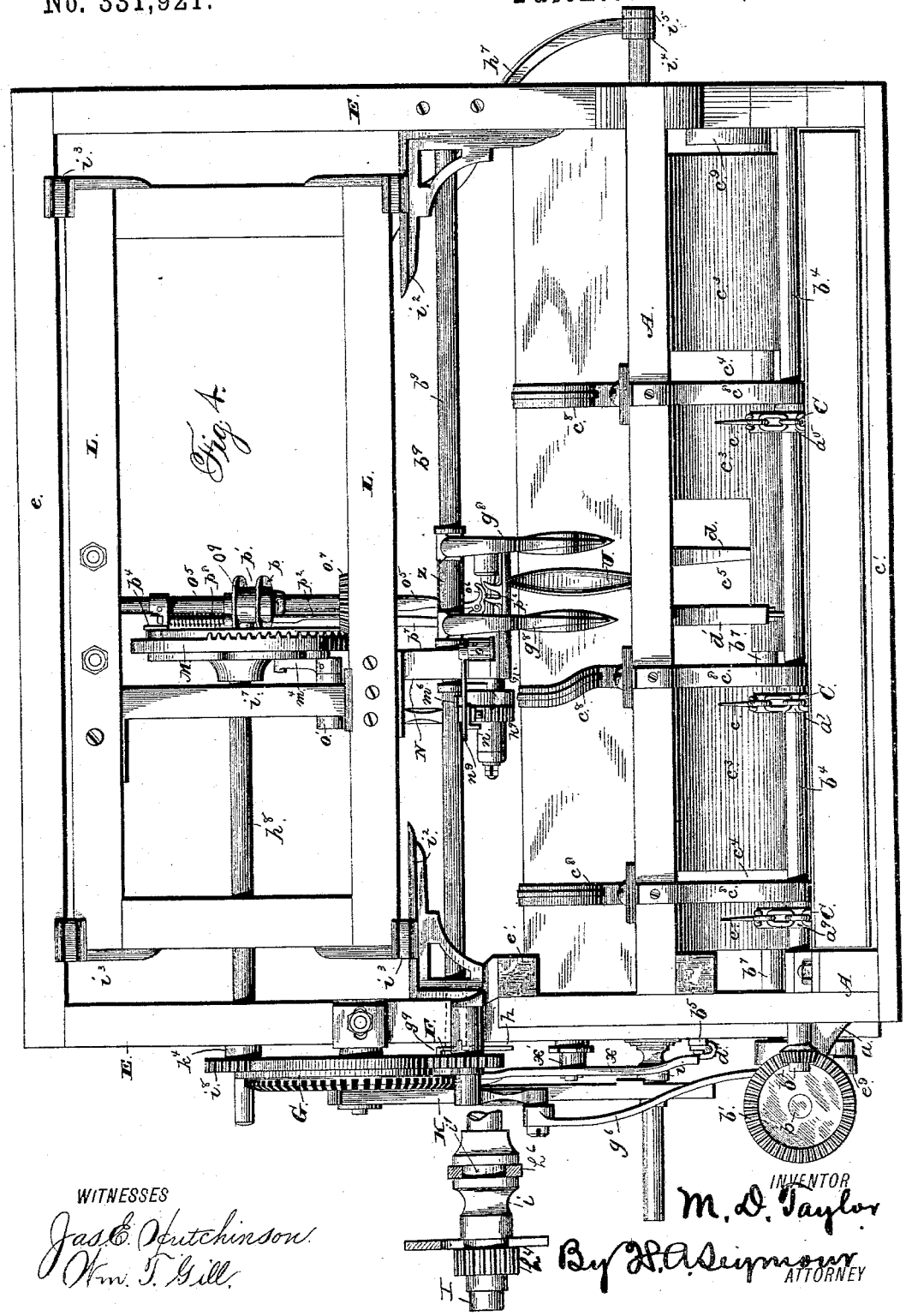
Figure 5:
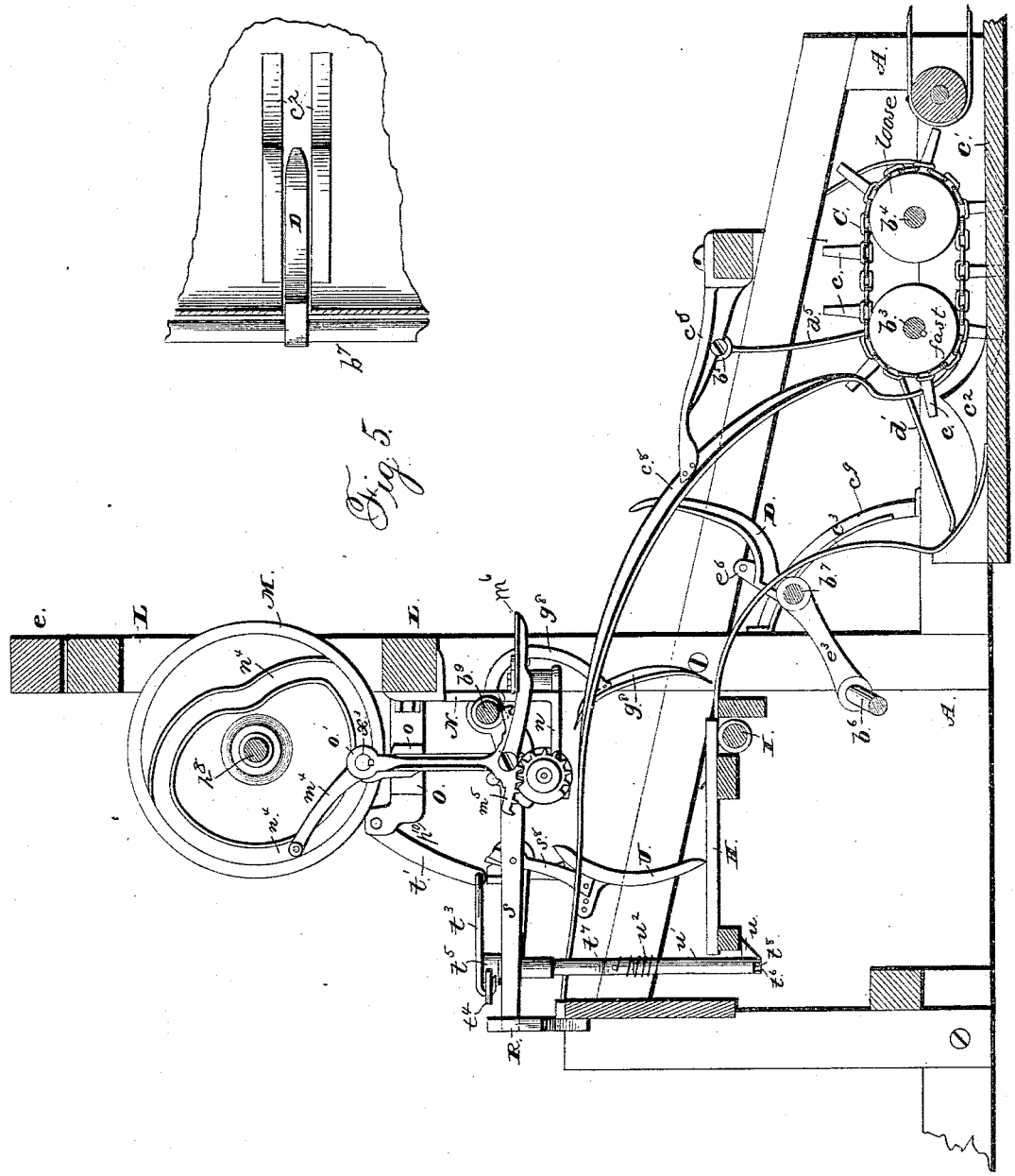

In the accompanying drawings, Figure 1 is a view in front elevation of a portion of the harvester embodying my improvements. Fig. 2 is a plan view. Fig. 3 is a rear elevation. Fig. 4 is an elevation of the inner side. Fig. 5 is a vertical section through line 1 1 of Fig. 2. Figs. 6 are detached views of the lifting-arms and shafts connected therewith. Fig. 7 is a detached view of the needle-shaft, needle, and binder-table. Fig. 8 is a detached view of the cord-holder, knife, and mechanism immediately connected therewith. Fig. 9 is a sectional view through the cord-holder shaft. Figs. 10 are detached views of the cord-holder shaft and jaws. Fig. 11 is a transverse section through line 2 2 of Fig. 8. Fig. 12 is a longitudinal section through the front end of the cord-holder shaft. Fig. 13 is a detached view of the knotter. Fig. 14 is a detached view of the compressor. Fig. 15 is a view of the spring-pressed angle-bar which engages the abutment. Fig. 16 is a view of the latch, and Fig. 17, Sheet 7, is a detached view of the mechanism for determining the size of the bundle.

A represents the frame of the binder. The reaper-frame is formed either by extending the frame A or securing a suitable reaper-frame rigidly to the frame A. The reaper used in connection with my improved harvester may be of any approved construction, as my present invention has no reference to that part of the harvester. The drive-wheel B, which supports the frame A, is situated within a portion of said frame near the outside, as shown, and is provided with beveled gear, which engages a pinion on a shaft which extends forward and communicates motion to the cross-shaft $b$, journaled in brackets $a$, the latter being rigidly secured to the front of the frame A.

Beveled gear-wheel $b'$ is rigidly secured on the outer end of the shaft $b$. The gear-wheel $b'$ engages a pinion, $b^2$, rigidly secured on the end of a shaft, $b^3$, the latter being journaled longitudinally in the frame A near the inside or reaper. A shaft, $b^4$, parallel to and alongside of the shaft $b^3$, is also journaled in the frame A. The shaft $b^3$ is provided at its rear end with a sprocket-wheel, $a'$, rigidly secured thereon, and the shaft $b^4$ is provided at its rear end with adjacent sprocket-wheels $a^2$ $a^3$. The wheel $a'$ is a little larger than $a^3$, and is connected therewith by a chain-belt. The shafts $b^3$ and $b^4$ are further provided with the sprocket-wheels $a^4$ $a^5$ $a^6$ $a^7$ $a^8$ $a^9$, all having the same diameter, arranged in corresponding positions on the shafts, and connected by endless chains C. The wheels $a^4$ and $a^6$ are rigidly secured on the shaft $b^3$, while the wheel $a^8$ is loosely mounted thereon. The wheels $a^5$ and $a^7$ are loosely mounted on the shaft $b^4$, while the wheel $a^9$ is rigidly secured thereon. A floor or a portion of the reaper-platform $c'$ extends under the shafts $b^3$ and $b^4$, and serves to support the grain in its motion from the reaper to the receptacle. An endless apron passing around rollers situated on the reaper-platform, or any other suitable device, is arranged to bring the grain transversely in contact with the chains C. These chains are provided at suitable intervals with prongs or teeth $c$, which are sufficiently long to reach a little lower than the upper surface of the floor, and are allowed a free motion in grooves cut in the floor for the purpose. These prongs $c$ draw the grain between the said chains and floor toward the receptacle. The motion of the shaft $b^3$ is imparted to the shaft $b^4$ by the chain which connects the sprocket-wheels $a'$ and $a^2$; but, the wheel $a^2$ being somewhat smaller than the wheel $a'$, the shaft $b^4$ will rotate faster than the shaft $b^3$. Now, the wheel $a^9$ being rigidly secured to the shaft $b^4$, and the wheels $a^4$ and $a^6$ being rigidly secured to the shaft $b^3$, the chain connecting $a^9$ with $a^8$ will move somewhat faster than the chains connecting $a^5$ with $a^4$ and $a^7$ with $a^6$, whereby the butts of the grain will be carried a little faster than the heads and a more perfect division thereby obtained.

If it is desirable at any time to have any one or more of the chains near the middle or heads of the grain to move faster than the chain carrying the butts, it is only necessary to release one or more of the wheels which are now rigidly secured, and rigidly secure the corresponding wheels which are now loosely mounted. I find it convenient to provide each wheel with feather and groove for this purpose. Furthermore, I do not wish to limit myself to the use of sprocket-wheels and chain for the purpose of transmitting motion from the shaft $b^3$ to the shaft $b^4$, as gear may be found preferable in many instances. Motion is communicated to the cutter-bar of the reaper by the sprocket-wheel $a^3$ on the shaft $b^4$.

The floor $c'$ extends horizontally toward the outside of the machine and forms the floor of the receptacle. On this floor three or more pairs of curved guides, $c^2$, are secured in a transverse position, each pair forming a recess or chamber for one of the lifting-arms D. A rigid apron, $c^3$, extending from the front to the rear of the frame A, rises from the floor of the receptacle in a compound curve to the platform of the binder. This apron $c^3$ is made of any suitable material, preferably of thin sheet metal, and is provided with elongated transverse slots $c^4$ and $c^5$, to allow the motions of the lifting-arms D and needle $d$, which will be hereinafter explained.

For the purpose of determining the size of the bundle, a spring-pressed trip-arm, $d'$, is loosely mounted on the shaft $b^2$, one end extending outward and resting on the floor of the receptacle. The trip-arm $d'$ is provided on its upper side with the projections $d^2$, between which one end of the connecting-rod $d^3$ is pivoted. The other end of the rod $d^3$ is pivoted between the projections $d^4$, secured to the end of the depending spring-arm $d^5$. The arm $d^5$ is rigidly secured on the rock-shaft $b^5$. The rock-shaft $b^5$ is conveniently situated parallel with and nearly above the shaft $b^3$, and has its front end journaled in bearings secured on the upper front rail of the frame A, and its rear end journaled in a laterally-extending bracket, $c^6$, secured to the upper inside rail of the frame A. The rock-shaft $b^5$ is provided with a spiral spring, $d^6$, the tension of which tends to hold the trip arm $d'$ in a depressed position, and with a crank, $d^7$, rigidly secured to its front end. The crank $d^7$ is provided at its end with a stud or pin, $d^8$, which engages the hooked or slotted end of a connecting-rod, $d^9$, the latter extending across the front of the frame A and terminating in two branches or jaws, through which it is pivoted to the upper arm of the trip-lever $c^7$. The upper arm of the trip lever $c^7$ is provided with a series of perforations, which admit of the rod $d^9$ being longitudinally adjusted, and thereby different-sized bundles determined, as shown in Fig. 1. As the grain gathers in the receptacle under the arm $d'$ it gradually raises the said arm, and thereby rotates the spring-actuated shaft $b^5$. The motion of the latter is communicated to the trip-lever $c^7$ through the connecting-rod $d^9$, and when the arm reaches a certain height the trip lever $c^7$ will release a dog, and thereby set the binding mechanism in motion, as will appear further on.

A set of guides, $c^8$, shaped to conform to the curve of the apron $c^3$ and floor-guides $c^2$, extend from inside the shaft $b^4$ to the outside of the binder-platform, being rigidly secured to the inside and outside upper rails of frame A. The object of these guides is to hold the grain down in contact with the carrying mechanism and prevent it from becoming entangled with the machinery. The main frame A is provided with upright posts or standards E near the middle of the front and rear ends. The standards E are connected by a top rail, $e$. The front standard is further connected with an upright at the inside front corner by the horizontal rail $e'$, the whole forming a special support for the binding and knot-tying mechanism. A shaft, $b^6$, is journaled in suitable bearings near the lower ends of the standards E, said shaft occupying a position in the rear of and a little above the receptacle-floor. The shaft $b^6$ is provided with arms $e^2$ and $e^3$ at the front and rear ends, respectively, within the frame A. The arms $e^2$ and $e^3$ are rigidly secured on the shaft $b^6$, and extend parallel to each other toward the grain-receptacle, terminating in bearings in which a shaft, $b^7$, is loosely mounted. To the shaft $b^7$ the receiving or lifting arms D are rigidly secured. The front end of this shaft $b^7$ is provided with a cam-wheel, $e^4$, having a shoulder on its periphery, said cam-wheel being rigidly secured on the shaft. A spring-actuated arm, $e^5$, loosely mounted on the shaft $b^6$, and provided with a shoulder at its end, is held in contact with the periphery of the cam-wheel $e^4$, and, when the shoulder on the arm engages the shoulder on the cam-wheel, locks the shaft $b^7$ against a rotary movement. The shaft $b^7$ is further provided with the arm $e^6$, rigidly secured on its rear end. The arm $e^6$ is provided with a laterally-extending projection, $e^7$, at its end, which is formed to slide on the curved guide $c^9$, secured to the under side of the rear transverse beam of the frame. The shaft $b^7$ is still further provided with the spiral spring $e^8$ near its rear end, the tension of which tends to depress the arms D when the shaft is allowed to rotate. The front end of the shaft $b^6$ is provided with a crank, $e^9$, rigidly secured thereon. The rod $g^6$ connects the crank $e^9$ with the crank $f$, rigidly secured on the hub of the small spur-wheel F, the latter being loosely mounted on a stud, $f'$, secured on the rail $e'$.

The spur-wheel F is constructed to engage the large spur-wheel G as follows: The wheel G is loosely mounted on a stud, $g$, secured to and extending from the front standard, E. The wheel G has beveled gear $g'$ on the front edge of its rim, which meshes with a pinion, $f^2$, rigidly mounted on the upper end of the oblique shaft $b^8$. The wheel G is provided on one-third of its periphery with spurs, which mesh with the spurs $g^2$ on the wheel F, and on the remaining two-thirds of its periphery with the delay-rim $g^3$, which engages a delay-shoe, $g$, rigidly secured on the hub of the wheel F, and thereby prevents the wheel F from rotating while in contact therewith. Motion is imparted to the wheel G through the oblique shaft $b^8$, provided at its upper end with the pinion $f^2$, as noted, and at its lower end with the pinion $f^3$, loosely mounted thereon. The pinion $f^3$ is provided with beveled gear, which meshes with beveled gear on a pinion, $f^4$, the latter rigidly secured on the main cross-shaft $b$ near its outer end. The pinion $f^3$ is further provided with a rim, $f^5$, on its upper side, the said rim having ratchet-like notches cut therein at suitable intervals.

A collar, $f^6$, is rigidly secured on the oblique shaft $b^8$ in close proximity to the upper surface of the loose pinion $f^3$. The collar $f^6$ is provided with a lug, $f^7$, to which is pivoted the spring-actuated clutch-dog $f^8$. One end of the dog $f^8$ is constructed to engage the notches on the rim $f^5$ and cause the pinion $f^3$ to rotate with the shaft $b^8$, while the other end is hook-shaped and constructed to engage a notch, $f^9$, in the end of the lower forwardly-extending arm of the trip-lever $c^7$, and when engaging said notch releases the clutch-dog from the notches in the rim $f^5$ of the pinion $f^3$. The lower end of the oblique shaft $b^8$ is journaled in suitable bearings in the outer bracket $a$, and the upper end in the bracket $g^5$, secured to the standard E.

The action of the trip-arm $d'$ in determining the size of the bundle will now be seen. The dog $f^8$ is held released from the pinion $f^3$ by its engagement with the trip-lever $c^7$ until the gathering of the grain under the trip-arm $d'$ releases the trip-lever from the clutch-dog $f^8$ and allows it to engage the pinion $f^3$, and thereby set the binding mechanism in motion. The first one-third revolution of the wheel G will turn the wheel F, and thereby communicate motion to the shaft $b^6$ through the cranks $e^9$ and $f$ and connecting-rod $g^6$. The first half-revolution of the wheel F will raise the receiving or lifting arms D, with the bundle of grain therein, to the height of the binding-platform, where the bundle is retained by arms constructed for the purpose, as will be fully explained further on. The spring-pressed arm $e^5$, loosely mounted on the shaft $b^6$, at this moment comes in contact with a stationary dog, $g^7$, (shown in Fig. 6,) secured on the inside of the upper front rail of the frame A, and is thereby thrown out of contact with the cam-wheel $e^4$. The spring-actuated shaft $b^7$ is thus unlocked and rotates, throwing the ends of the lifting-arms D near the floor of the grain-receptacle at the outer ends of the grooves, and also bringing the bearing $e^7$ on the end of the arm $e^6$ in contact with the curved guide $c^9$. The second half-revolution of the wheel F causes the shaft $b^6$ to rotate in the opposite direction back to its first position, and thereby causes the arms D to move inwardly in their chambers, and thus pass under any grain which has accumulated in the receptacle while the arms were in an elevated position. The spring-pressed arm $e^5$ again engages the shoulder on the cam-wheel $e^4$, and the lifting-arms are ready to repeat the motion just described when the toothed portion of the periphery of G shall again engage F.

A locking-lever, $x$, mounted on a forwardly-extending stud, $x'$, secured to the standard E, engages a stop adjustably secured on the connecting-rod $d^9$, while its upper end is adapted to engage a pin on the periphery of the wheel G, and thereby move the connecting-rod $d^9$ outwardly and set the trip-lever $c^7$ in a position to engage the dog $f^8$, and thereby throw the binder out of gear.

A horizontal rock-shaft, $b^9$, is journaled in suitable bearings secured to the outsides of the standards E. This shaft $b^9$ is provided with compressing-arms $g^8$, secured on the said shaft by feather and groove or other suitable means, preferably by means of the sleeve $z$, in such a manner as to vibrate with the shaft and slide thereon. The front end of the shaft $b^9$ is provided with the operating-arms $g^9$ and $h$, the former, $g^9$, being constructed to engage the cam-groove $h'$ on the back surface of the wheel G, and hold the arms $g^8$ in close contact with the bundle, and the latter, $h$, to engage the hook $h^2$ on the rim of the wheel G, and lift the arms $g^8$ and hold them in readiness to receive the bundle from the lifting-arms D.

The binding platform or table H is hinged on a rock-shaft, I, which is journaled in suitable bearings attached to the upper front and rear rails of the frame A. The upper edge of the apron $c^3$ is secured on the shaft I by means of loose sleeves, in which the shaft is allowed a sliding motion. An elbow-shaped needle, $d$, is rigidly secured on the shaft I. A projecting arm or shoulder, $h^3$, on the tail of the needle $d$ is constructed to engage the table H when the needle is elevated and table depending, and hence as the shaft I is turned to lower the needle the table will be raised to a horizontal position; but when the motion of the shaft I is reversed to elevate the needle the table is not disturbed. A rocking motion is imparted to the shaft I from the wheel G by the peculiar-shaped operating-rod K. The upper end of this rod terminates in an elongated loop, $k$, adapted to embrace the hub of the wheel G, while its lower end terminates in a rack, $k'$, adapted to engage the pinion $h^4$. The rod K is further provided with the stud $k^2$ at the lower end of the loop $k$, which stud is constructed to engage a cam-groove, $h^5$, on the front of the wheel G, and with the retaining-arm $k^3$, constructed to hold the rack $k'$ in contact with the pinion $h^4$. The pinion $h^4$ is rigidly secured to or cast integral with the sleeve $i$, the latter being secured on the shaft I and caused to rotate with the shaft by feather and groove and allow the shaft a sliding motion therein. The sleeve $i$ is held against a longitudinal movement with the shaft by a bracket, $h^6$, terminating in a concave edge, which partially embraces the said sleeve in a groove, $i'$.

The knot-tying mechanism is secured to a rectangular longitudinally-sliding frame, L, supported upon knee-brackets $i^2$ at its lower corners, and provided with bearings $i^3$ at its four corners, which overlap the brackets $i^2$ and top rail, $e$, thus securing the frame against lateral displacement. The frame L is connected with the shaft I by a curved arm, $h^7$, one end of which is rigidly secured to the lower rear corner of the said frame, and the other end loosely embraces the shaft I near its rear, and is held against a sliding motion on the shaft by collars $i^4$ and $i^5$, rigidly secured on the shaft. The object of the sliding frame L is to allow the binding mechanism to be moved forward or backward, as the length of the grain may require, and thus attach the bands in the same relative positions.

Motion is communicated to the knot-tying and discharging mechanism by the shaft $h^8$, the front end of which is journaled in a bracket, $i^6$, secured to the front standard, E, and the rear end in a suitable bearing secured to an upright brace, $i^7$, the latter being firmly secured to the upper and lower rails of the sliding frame L. The front end of the shaft $h^8$ is provided with a sleeve, $k^4$, which is caused to rotate with the shaft by feather and groove, and in which the shaft is allowed a sliding motion. The sleeve $k^4$ is provided at its front end with the pinion $i^8$, rigidly secured thereon, and at its rear end with the collar $i^9$, also rigidly secured thereon. By means of the collar $i^9$ and pinion $i^8$ the sleeve $k^4$ is held against longitudinal movement on the shaft. The pinion $i^8$ is of the same size and provided with the same number of teeth as the wheel F, and is constructed to engage the one-third toothed portion of the rim of the wheel G, and be turned once around thereby. The pinion $i^8$ is also provided with a concave delay-shoe, $i^{10}$, rigidly secured to the face of the pinion, and adapted to engage the delay-rim of the wheel G during two-thirds of the revolution of said wheel G, and thereby hold the pinion against rotation. On the rear end of the shaft $h^8$ the large drive-wheel M is rigidly secured.

The knot-tying mechanism is secured to the sliding frame L by means of the depending bracket N, firmly secured to its under rail, the outwardly-extending bracket O, secured to the under rail, and the outwardly-extending bracket P, secured to the upper rail. The depending bracket N is provided with an outwardly-extending arm, $n$, to the outer end of which a horizontal longitudinally-extending sleeve, $n'$, is firmly secured. A flat horizontal bar, $n^2$, is firmly secured at its inside front corner to the depending bracket N, and terminates outwardly in two upright extensions, $l\ l'$, through the first of which, $l$, the said table is secured to the sleeve $n'$, and to the second of which, $l'$, the short sleeve $n^3$ is firmly secured.

A shaft, $m$, is mounted in the sleeve $n'$, and terminates rearwardly in a flat tongue, $m'$. The shaft $m$ is provided with two diametrically-opposite longitudinal grooves, $m^2$, in which the jaws $l^2$ are allowed a limited sliding motion. The jaws $l^2$ are provided with lugs $l^3$ near their forward ends, and with serrations or teeth at their rear ends. A wheel or collar, $h^9$, provided with notches $k^5$ and cams $k^6$, is rigidly secured on the shaft $m$ adjacent to the front end of the sleeve $n'$. A sleeve, $k^7$, provided with an internal cam-groove, $k^8$, is loosely mounted on the shaft $m$, and has a collar or rim, $k^9$, rigidly secured on its rear end. The rim $k^9$ is provided with teeth half-way round or more, and with a perforation, $l^4$, in which a dog, $l^5$, operated by spring $l$, is retained. The cam-groove $k^8$ engages the lugs $l^3$, and the dog $l^5$ engages the notches $k^5$ in the wheel $h^9$, when the sleeve $k^7$ is turned in one direction, but, because of the notches $k^5$ being cut away on one corner, allows the sleeve $k^7$ to rotate in the opposite direction freely. The stationary sleeve $n'$ is provided with an upright arm, $l^6$, at its front end, to which is pivoted a spring-pressed dog, $l^7$, the latter constructed to engage the notches in the wheel $h^9$, and thereby prevents the shaft $m$ from rotating. A ring-bearing, $l^8$, is rigidly secured to the shaft $m$ at the rear end of the sleeve $n'$, and, together with the wheel $h^9$, locks the shaft $m$ against longitudinal motion in the sleeve.

A head, $l^9$, provided with the forwardly-extending jaws $m^3$, is secured in the short sleeve $n^3$ and allowed a rotary motion therein. The ends of the jaws $m^3$ are serrated or notched to correspond with the ends of the jaws $l^2$. The rearwardly-extending flat tongue $m'$ of the shaft $m$ extends between the jaws $m^3$, and thereby causes the head $l^9$ to rotate with it.

The bracket O is provided with a forwardly-extending elbow-projection, $o$, terminating in a suitable bearing, $o'$, in which the short rock-shaft $x^3$ is journaled. The rear end of the shaft $x^3$ is provided with the crank-arm $m^4$, rigidly secured thereon, and the front end with the sector-arm $m^5$, rigidly secured thereon. The crank-arm $m^4$ is adapted to engage the cam-groove $n^4$ on the front surface of the wheel M, and thereby cause the sector-arm to be reciprocated at required intervals. The toothed sector-arm $m^5$ engages the toothed portion of the rim $k^9$, and is provided with a shoulder or projection, $m^6$, which engages the dog $l^7$ and lifts said dog out of the notch $k^5$ just as the said sector-arm completes its outward motion. At this moment, too, the dog $l^5$ is in contact with the notch $k^5$, and as the sector-arm vibrates inward, the sleeve $k^7$ being now locked to the wheel $h^9$, the shaft $m$ will perform a half-revolution, and thereby cause the upper and lower jaws $l^2$ $l^2$ to change positions. The outward vibration of the sector-arm will now cause the sleeve $k^7$ to rotate on the shaft $m$, and, by means of the cam-groove $k^8$ in contact with the lugs on the jaws $l^2$, will cause the lower jaws to separate and the upper to close tightly. During the outward vibration of the sector-arm the shaft $m$ is held against rotating by the dog $l^7$ in one of the notches $k^5$. The cams $k^6$ on the periphery of the wheel $h^9$ serve to guide the projection $m^6$ against the heel of the dog $l^7$.

The cord-cutter consists of an upright knife, $m^7$, firmly secured on an elongated flat plate, $m^8$, the latter constructed to rest and slide on the bar $n^2$. The plate $m^8$ is provided with a long curved slot, $n^5$, adapted to receive a stud, $n^6$, rigidly set in the table $n^2$. The shape of the slot $n^5$ is such as to carry the knife $m^7$ close to the jaws of the cord-holder, thus causing the twine to be cut as near the end as possible as the plate slides rearward. The plate $m^8$ is further provided with the upwardly-extending notched projection $y^4$, for the purpose of guiding the binding-twine.

A short upright rock-shaft, $n^7$, is secured in a socket, $o^2$, on the inside of the depending bracket N, and is furnished with horizontal arms $n^8$ and $n^9$ at the lower and upper ends, respectively. The arm $n^8$ extends outward and articulates with the forward end of the sliding plate $m^7$, and the arm $n^9$ extends forward and engages, by means of a stud or pin, $o^3$, an elongated slot, $m^9$, in the inside end of the connecting-rod $o^4$. The outer end of the rod $o^4$ is pivoted to the end of the sector-arm $m^5$.

It will thus be seen that the vibrations of the sector-arm will reciprocate the knife, as will be noticed more particularly hereinafter.

The knotter consists of an upright shaft, $o^5$, journaled in suitable bearings on the brackets O and P, and terminating at its lower end in the upper jaw, $o^6$, of the tyer-bill. A pinion, $o^7$, provided with bevel-gear, is rigidly mounted on the shaft $o^5$, and is adapted to engage the bevel-gear teeth $o^8$, which extend about one-fourth the distance around the rear side of the rim of the wheel M, and cause the shaft $o^5$ to make one complete revolution.

The shaft $o^5$ is further provided with the collar $o^9$, caused to rotate therewith by feather and groove and allowed a sliding motion thereon, having two parallel winding-flanges, $p$, forming a cam-groove, $p'$, which receives the rear end of the hub of wheel M. A sliding rod, $p^2$, is retained in an upright position between the shaft $o^5$ and wheel M, in close proximity to the shaft $o^5$, by passing through perforations in the pinion $o^7$, collar $o^9$, and boss $p^3$, the latter being secured rigidly on the shaft $o^5$ and provided with a delay-shoe, $p^4$, constructed to engage a rearwardly-extending delay-rim, $p^5$, on the wheel M and prevent the shaft $o^5$ from rotating while so engaged.

The rod $p^2$ is connected to the heel of the lower jaw, $p^6$, of the tying-bill by the link or bifurcated rod $p^7$, pivoted thereto. The lower jaw, $p^6$, is pivoted to the under side of the upper rigid jaw, $o^6$, and provided with a heel-extension, to the end of which the said connecting-rod $p^7$ is pivoted. The rod $p^2$ is allowed a sliding motion in its bearings, and is held in its position by a pin or lug, $p^9$, firmly set therein in contact with a rim on the upper side of the collar $o^9$. The rod $p^2$ is further provided with a spiral spring, $p^8$, which holds the said rod in a depressed position, and thereby holds the toe of the lower jaw in close contact with the toe of the upper jaw of the tying-bill, except when the rod is forced upward.

The cam-groove on the collar $o^9$ is so constructed with reference to the bevel-gear on the wheel M that the rod $p^2$ will be forced upward and the toe of the lower jaw of the tying-bill thereby forced downward and the jaws opened just before the tying-bill completes its revolution, for reasons which will hereinafter appear.

The discharging mechanism is mainly supported by a rectangular frame, S, terminating inwardly in two branches, which loosely embrace the sleeve $z$ on the shaft $b^9$, and outwardly in a flat end adapted to rest and slide longitudinally in an oblong closed slot, $z'$, formed in the supporting-bracket R. The depending portion of the bracket N rests in contact with the sleeve $z$, and by means of a collar on the front end of the sleeve and one of the compressor-arms, both being secured rigidly to the sleeve, causes the sleeve to slide along the shaft $b^9$ simultaneously with the frame L.

An angle-bar, $s$, provided with an oblong closed slot, $s'$, at the vertex of the angle, is loosely mounted on a pivot, $s^2$, the pivot passing through the said slot and secured transversely in the frame S. The outer end of the bar $s$ rests on a cross-rail, $s^6$. The horizontal arm of the bar $s$ is provided with two laterally-extending perforated lugs, $s^5$, through which a spindle, $s^3$, loosely mounted on the pivot $s^2$, freely passes. A spiral spring, $s^4$, on the spindle $s^3$ has its outer end attached to the spindle, while its inner end presses against the lug $s^5$ and is free to slide on the spindle, thus exerting its tension in forcing the lower end of the angle-bar inwardly. The depending arm of the bar $s$ is provided on its front side with a shoulder, $s^7$, constructed to closely engage an arm, $s^8$, loosely mounted on the pivot $s^2$. The lower end of the arm $s^8$ is bifurcated to receive the outwardly-extending arm $s^9$ of the compressor U, the said arm being provided with a series of perforations, by means of which it is secured in lateral adjustment in the end of the arm $s^8$.

The bracket O is provided with two outwardly-extending arms, $p^{10}$, between which a lever having the arms $t\ t'$ is pivotally secured. The upper arm, $t$, is provided with a stud or pin, $t^2$, which engages a cam-groove, T, on the rear side of the wheel M, and the lower arm, $t'$, is pivotally secured to one end of the connecting-rod $t^3$. The outer end of the connecting-rod $t^3$ is pivoted to the end of a laterally-extending arm, $t^4$, secured to a sector-shaped boss, $t^5$. The boss $t^5$ is firmly secured to the upper end of a latch-rod, $t^6$, the latter being loosely mounted in a long vertical sleeve, $t^7$, secured to the under side of the cross-rail $s^6$. The latch proper consists of a laterally-extending plate, $u$, having its lower edge curved outward, to allow the binder-platform to rise past it without interruption, secured to an upright sleeve, $u'$, which fits loosely on the lower end of the latch-rod $t^6$. The sleeve $u'$ is held on the rod $t^6$ by a pin, $t^8$, set in the lower end of the rod, and working in an open slot, $t^9$, in the lower end of the sleeve. A spiral spring, $u^2$, has one end fastened to the rigid sleeve $t^7$, and the other to the loose sleeve $u'$. The tension of this spring tends to hold the latch below the binder-platform. The slot $t^8$ in the lower end of the sleeve $u'$ allows the sleeve to turn sufficiently to let the binder-platform pass the latch in its upward motion. The inner end of the connecting-rod $t^3$ is provided with a dog, $u^3$, which, as the connecting-rod moves inward, engages the upper arm of the lever $s^8$. This same motion of the connecting-rod $t^3$ also turns the sector-boss $t^5$, and thereby releases the horizontal arm of the angle-bar $s$. Thus as the dog $u^3$ engages the upper arm of the lever $s^8$ the lower arm of the said lever will press against the depending arm of the angle-bar $s$, and the horizontal arm of the angle-bar being now free the compressor U will be thrown outward. This same motion of the rod $t^3$ will also disengage the latch from the binder-platform and allow the platform to fall. The object of the elongated slot $s'$ in the angle-bar $s$ is to relieve the compressor U from any unusual strain by allowing it to recede against the tension of the spring $s^4$ on the spindle $s^3$, which tension serves to react upon the bundle when the ejector is unlatched.

A twine-receiver, Y, is secured on the rear outer portion of the frame A. The twine renders through a perforation, $y$, in the top of the box, and, passing inwardly to the upper edge of the apron, passes forward through eyes $y'$ to the base of the needle, thence through a perforation in the base of the needle, and through eyes $y^2$, secured to the back of the needle, and out through the hollow point $y^3$.

The binding and ejecting mechanism as a whole operates as follows: Suppose the binder-platform to be latched in a horizontal position, the needle depressed, the end of the twine closely held between the lower jaws of the cord-holder, the twine passing over the tying-bill, the upper jaws of the cord-holder open, the sector-arm $m^5$ ready to begin its outer motion, and binding mechanism just thrown in gear, in the manner hereinbefore fully described. The first one-third revolution of the drive-wheel G revolves the wheel F, and thereby lifts the gavel to the binder-platform, and returns the lifting-arms to their positions in the grain-receptacle. The latter portion of this one-third revolution also lowers the compressing-arms and retains the gavel under the knotter. The operating-rod, engaging the cam-groove on the front of the wheel G and the needle-shaft, now forces the needle, with the twine rendering through its point, over the gavel and past the tying-bill, laying the twine on the bill and between the upper jaws of the holder. At this moment the gear on the rim of the wheel G engages the pinion on the shaft of the drive-wheel M, and causes it to make one revolution. The first part of the revolution of M rotates the tying-bill, the gear on the rear of M engaging the pinion on the tying-bill shaft, thus forming a loop of the two parts of the twine lying on the bill, and, as before noticed, the toe of the lower jaw opens from the toe of the upper jaw of the tying-bill just before the revolution is completed, and thus seizes both parts of the twine and holds them tightly. At this moment the sector-arm, in contact with the sleeve on the cord-holder shaft, moves outward, thereby opening the lower jaws of the cord-holder and closing the upper jaws on the cord, and at the same time forcing the knife forward, and severing the cord between the foot of the knotter and the upper jaws of the cord-holder. At this same moment, too, the lever-arm, in contact with the cam-groove on the rear of the wheel M, unlatches the binder-platform, and throws the compressor away from the bundle. The weight of the bundle now draws the loop over the end of the tying-bill, while the ends of the twine are held between the upper and lower jaws of the bill, thus forming the knot. The weight of the bundle is sufficient now to release the ends of the twine from the bill, and the bundle falls to the ground. The sector-arm $m^5$ now makes its inward vibration, and thereby forces the knife back to its first position, and rotates the cord-holder shaft one half-revolution, thereby leaving the shortest possible distance between the end of the twine held in the now lower jaws and the knife. At this same time, also, the operating-rod, in contact with the needle-shaft and cam-groove on front of wheel G, depresses the needle, and thereby raises the binder-platform to its horizontal position. The pin on the rim of G, just as the last operation is completed and just as the wheel G completes its revolution, engages the end of the lever $x$ and throws the binder mechanism out of gear, in the manner before described, and the whole process is in readiness to be repeated when a sufficient amount of grain has gathered in the receptacle to form another gavel.

I do not wish to be understood as limiting myself strictly to the construction and positions of parts as set forth herein, but reserve the privilege of making such slight changes as fairly fall within the spirit and scope of my invention.

Having fully described my invention, what I claim as new, and desire to secure by Letters Patent, is—

1. In a self-binding harvester, the combination, with two horizontal shafts, each provided with one or more loose pulleys and one or more fixed pulleys, of a series of endless chains mounted on said pulleys, substantially as set forth.

2. In a self-binding harvester, the combination, with two horizontal shafts provided with sprocket-wheels carrying endless chains, some of the said sprocket-wheels being loosely mounted and others rigidly mounted on the shafts, of mechanism for revolving the shafts at different rates, and thereby driving the chains at different rates, for the purpose substantially as set forth.

3. In a self-binding harvester, the combination, with two horizontal shafts driven at different rates, of sprocket-wheels mounted in corresponding positions on the shafts, endless chains connecting each two corresponding wheels, and endless conveyers for depositing the grain within reach of the chains, substantially as set forth.

4. In a self-binding harvester, the combination, with two shafts driven at different rates of speed, one or more loose pulleys and one or more fixed pulleys mounted on each shaft, and carrying chains and provided with prongs or arms, of a floor located below the shafts, and having grooves through which the prongs on the chain pass.

5. In a grain-binding harvester, the combination, with a grain-receptacle, devices for packing the grain into said receptacle, and a spring-pressed tripping-arm adapted to be elevated by the grain as it is packed in the receptacle, of a binder-table situated in a plane above the grain-receptacle, an apron connecting the table and receptacle, lifting-arms passing through slots in the apron, and devices indirectly connecting the spring-actuated tripping-arm and lifting-arms, whereby motion is imparted to said lifting-arms, substantially as set forth.

6. In a self-binding harvester, the combination, with a grain-receptacle, a binder-platform, and a curved apron extending from the receptacle to the binder-platform, of a shaft, arms secured to said shaft, a spring-actuated shaft journaled in said arms, lifting-arms secured to the spring-actuated shaft, and guides for turning the spring actuated shaft.

7. In a self binding harvester, the combination, with a grain-receptacle having grooves or -recesses therein, a binder-platform, and a curved apron connecting the receptacle and platform, of a shaft having laterally-projecting arms, a spring-actuated shaft journaled in said arms, guides for controlling the rotary movement of said spring-actuated shaft, and lifting-arms secured to the spring-actuated shaft, and adapted when in their lowered position to rest within the grooves or recesses.

8. In a grain-binding harvester, the combination, with a grain-receptacle, a binder-table, and a curved apron connecting the receptacle and table, of a shaft, $b^6$, having arms rigidly secured thereto and a spring-actuated arm movably secured thereon, a shaft, $b^7$, journaled in the outer ends of the rigid arms, a spring encircling the shaft $b^7$ and engaging one of the rigid arms, a cam secured on the shaft $b^7$ and adapted to engage the spring-actuated arm on the shaft $b^6$, lifting-arms secured to the shaft $b^7$, and devices, substantially as described, for controlling the rotary movement of the spring-actuated shaft.

9. In a self-binding harvester, the combination, with a receptacle provided with grooves or recesses, of a set of lifting-arms secured on a spring-actuated shaft, and means for raising the arms to the binder-platform, causing them to make a semi-revolution and then slide along the grooves to their positions therein, substantially as set forth.

10. The combination, with the grain-receptacle, spring-pressed trip-arm, and rod indirectly connecting the trip-lever and spring-pressed trip-arm, of a driving-shaft, an oblique shaft connecting the driving-shaft to the tying mechanism, the loose pinion on the lower end of the oblique shaft, and the spring-actuated dog secured to said shaft, all of the above parts combined and operating substantially as set forth.

11. The combination, with a grain-receptacle, a spring-pressed trip-arm situated within the receptacle, a trip-lever indirectly connected to the spring-actuated arm by a connecting-rod, a stop secured on said rod, a driving-shaft, tying mechanism, an oblique shaft, and gearing for transmitting the motion of the driving-shaft to the tying mechanism, of a trip-lever for moving the trigger, and the pawl for engaging the trigger and locking the lower pinion on the oblique shaft to a pinion on the driving-shaft, substantially as set forth.

12. In a self-binding harvester, the combination, with a set of lifting-arms secured on a spring actuated shaft, said shaft being journaled in arms which are rigidly secured to a rock-shaft, of means for automatically lifting, rotating, and returning the arms to a depressed position, substantially as set forth.

13. In a self-binding harvester, a rock-shaft provided with rigid arms, a spring-actuated shaft loosely mounted in the said arms, having lifting-arms secured thereto, a spring-pressed arm secured on the rock-shaft and locking the lifting-arm shaft against rotation, a dog rigidly secured to the main frame, constructed to engage the spring-pressed arm, and thereby unlock the spring-actuated shaft, the whole arranged in the manner and for the purpose substantially as set forth.

14. The combination, with a rotary knotter, of a rotary shaft, holding jaws located on opposite sides thereof, and devices for simultaneously moving one jaw forward and the other backward.

15. In a self-binding harvester, the combination, with a rotary knotter, of a rotary shaft, reciprocating jaws located on opposite sides of the said shaft for holding the twine, the said shaft and jaws adapted to make a semi-revolution before the tying of each knot, and thereby prevent waste of twine, and a sliding cutter located between the holding jaws and the knotter, substantially as set forth.

16. In a self-binding harvester, the combination, with a rotary knotter, of reciprocating jaws secured in diametrically-opposite positions on a rotary shaft, and provided with end teeth which are alternately interlocked with and released from corresponding teeth on the end of a head, for the purpose substantially as set forth.

17. The combination, with a rotary knotter, of a cord-holder consisting of two diametrically-opposite toothed jaws reciprocated on a shaft by means of a cam-groove on the interior of a rotating sleeve, and rotated by means of a ratchet on the cord-holder shaft, for the purpose substantially as set forth.

18. The combination, with a knotter, of a cord-holder having upper and lower jaws, the under jaws adapted to hold the end of the cord when the needle is depressed, and the upper jaws adapted to receive the cord after it is passed about the gavel, substantially as set forth.

19. The combination, with a knotter and cord-holding jaws having a longitudinally-sliding motion on a rotary shaft, of a sector-arm adapted to move or slide the jaws when moved in one direction and rotate the shaft when moved in the opposite direction, substantially as set forth.

20. The combination, with a reciprocating sector-arm, of cord-holding jaws adapted to be rotated by the sector-arm, and a cord-cutter, also adapted to be reciprocated by the same sector-arm, substantially as set forth.

21. The combination, with a reciprocating sector-arm and sliding cord-holding jaws secured to a rotary shaft, of a sleeve having a cam-groove in contact with the sliding jaws, and a toothed rim in contact with the sector-arm, whereby the motion of the sector arm operates the jaws, substantially as set forth.

22. The combination, with a reciprocating sector-arm, of a cord-cutter connected with the sector by an angle-lever and connecting-rod, and sliding cord-holding jaws adapted to be operated by the sector while the cutter is being returned to position, substantially as set forth.

23. The combination. with a rotary knotter and cord-holder, consisting of reciprocating jaws secured on a rotary shaft, of a reciprocating knife located between the cord-holders and knotter, secured to a sliding plate, substantially as set forth.

24. The combination, with a rotary knotter consisting, essentially, of an upper jaw having a clamping under jaw pivoted thereto, and a cord-holder consisting of reciprocating toothed bars secured in grooves on a rotating shaft, of a cord cutter reciprocated in a curved path, for the purpose substantially as set forth.

25. In a self-binding harvester, a cord-holder consisting of a shaft provided with longitudinal grooves, bars, or jaws having toothed or serrated ends and outwardly-extending lugs, said jaws being constructed to slide longitudinally in the said grooves, a loose sleeve embracing the shaft and sliding bars, said sleeve being provided with an internal cam-groove which engages the lugs on the sliding bars, and further provided with a toothed rim, a notched wheel rigidly secured on the shaft, and a head provided with toothed or serrated projections, constructed to rotate with the shaft, the whole constructed in the manner and for the purpose substantially as set forth.

26. In a self-binding harvester, the combination, with a reciprocating plate having a curved slot therein, and a twine-cutter secured to said plate, of a lug resting in the slot and adapted to cause the plate to reciprocate in a curved path, thereby bringing the edge of the knife in close proximity to the cord-holder, for the purpose substantially as set forth.

27. In a self-binding harvester, the combination, with a rock-shaft, of a needle and binder-platform secured therein in such a manner that the depression of the needle elevates the table, substantially as set forth.

28. In a self-binding harvester, the combination, with a rock-shaft, of a binder-table hinged loosely thereon, and a needle secured rigidly thereon, the table and needle being so constructed and secured upon the shaft that the needle moves independently of the table except when the table is depending, for the purpose substantially as set forth.

29. The combination, with a needle-shaft, and a needle rigidly secured thereto and provided at its heel with a projection, of a table pivoted to the shaft and adapted to be elevated by said projection, substantially as set forth.

30. The combination, with a needle-shaft and needle, of a table hinged to said shaft and adapted to be elevated by the movement of the shaft, and a spring-actuated catch for holding the free end of the table, substantially as set forth.

31. The combination, with a needle-shaft and needle, of a table pivoted to the shaft, a spring-actuated catch for holding the free end of the table elevated, and devices, operated by the mechanism which operates the tying mechanism, for releasing the catch and dropping the table, substantially as set forth.

32. The combination, with a needle-shaft, needle, and table pivoted to said shaft, of a spring-actuated catch, and devices connected to said shaft whereby the table is elevated, and devices connecting the catch to the tying mechanism whereby the table is released after the gavel is tied, substantially as set forth.

33. The combination, with a rock-shaft provided with a sleeve having a sliding motion thereon and caused to rotate therewith, and compressor-arms rigidly secured to the sleeve, of an opposing compressor having one end loosely secured on the sleeve and the other end secured in an elongated slot, substantially as set forth.

34. The combination, with a sliding frame, a rock-shaft provided with a sleeve having a sliding motion thereon and caused to rotate therewith, and compressor-arms secured to the sleeve, of an opposing compressor having one end loosely secured on the sleeve and the other end secured in an elongated slot, and devices connecting the sliding frame and sleeve whereby they are moved simultaneously.

35. The combination, with a rectangular sliding frame carrying the knot-tying mechanism, a needle-shaft having a needle secured rigidly thereon, a binder-table hinged thereon, and devices connecting the sliding frame and needle-shaft, of a shaft supporting compressor-arms, and devices connecting the sliding frame and compressor-arm shaft.

36. The combination, with the knotter mechanism, a binding-platform hinged at one end, and a yielding compressor, of mechanism connecting the knotter mechanism, yielding compressor, and binder-platform, whereby the compressor and platform are simultaneously released, substantially as set forth.

37. The combination, with a rectangular sliding frame carrying the knot-tying mechanism, and a needle-shaft having a needle secured rigidly thereon, and a binder-table hinged thereon, of devices connecting the sliding frame and needle-shaft, whereby the frame, needle, and table are moved simultaneously, substantially as set forth.

38. The combination, with a lever pivoted to the compressor-support, and compressor secured in lateral adjustment to the lower end of the lever, of an angle-bar pivoted adjacent to the lever in yielding lateral adjustment, the lower end of said angle-bar forming a lateral bearing for the compressor, substantially as set forth.

39. The combination, with a lever pivoted to the compressor-support, and the compressor secured to the lower end of the lever, of a spring-pressed yielding angle-bar pivoted in close contact with the said lever, and forming together with the lever a bearing for the compressor, substantially as set forth.

40. The combination, with a knotter-shaft terminating at its lower end in the upper jaw of the tying-bill, and a cam-grooved sliding collar secured on the shaft, of a spring-pressed sliding rod pivoted to the lower jaw of the tying-bill and adapted to follow the motion of said sliding collar, and a driving-wheel adapted to engage the cam-groove and elevate the collar, substantially as set forth.

In testimony whereof I have signed this specification in the presence of two subscribing witnesses.

MILES D. TAYLOR.

Witnesses:
CHARLES M. SCANLAN,
JOHN H. WATSON.